United States Patent [19]

Wakai et al.

[11] Patent Number: 4,893,006
[45] Date of Patent: Jan. 9, 1990

[54] OPTICAL TIME DOMAIN REFLECTOMETER WITH LEVEL ADJUSTING FUNCTION

[75] Inventors: Toshiyuki Wakai; Toshiyuki Kashiwabara, both of Atsugi, Japan

[73] Assignee: Anritsu Corporation, Tokyo, Japan

[21] Appl. No.: 258,995

[22] Filed: Oct. 17, 1988

[30] Foreign Application Priority Data

Oct. 19, 1987 [JP] Japan .................. 62-261850
Sep. 30, 1988 [JP] Japan .................. 63-244226

[51] Int. Cl.$^4$ .................................... H01J 5/16
[52] U.S. Cl. ................................ 250/227; 356/73.1
[58] Field of Search .............. 250/227; 350/96.29; 356/73.1

[56] References Cited

U.S. PATENT DOCUMENTS 4,276,604  6/1981  Kitamura et al.
4,708,471 11/1987  Beckmann et al. .............. 356/73.1
4,732,469  3/1988  Souma ........................... 356/73.1
4,794,249 12/1988  Beckmann et al. .............. 250/227

Primary Examiner—Edward P. Westin
Assistant Examiner—Khaled Shami
Attorney, Agent, or Firm—Frishauf, Holtz, Goodman & Woodward

[57] ABSTRACT

An optical pulse supplying section supplies an optical pulse to a target optical fiber. A reflection light detecting section outputs an electric signal corresponding to the reflection light from the target optical fiber. Upon reception of the electric signal from this detecting section, a level controlling section controls the level of the received signal according to an initial value or compensation value. An A/D converter receives the output signal of the level controlling section and outputs a digital signal corresponding to the received signal. A parameter input section is for inputting a parameter to determine the level that indicates the reflection light from the target optical fiber. An initial value memory stores the initial value to be set in the level controlling section, in accordance with the parameter from the parameter input section. A compensation value computing section compares the digital signal from the A/D converter, which corresponds to the initial value, with a reference value to compute the compensation value that should be set in the level controlling section. A processing section performs a signal processing to output the digital signal from the A/D converter.

12 Claims, 9 Drawing Sheets

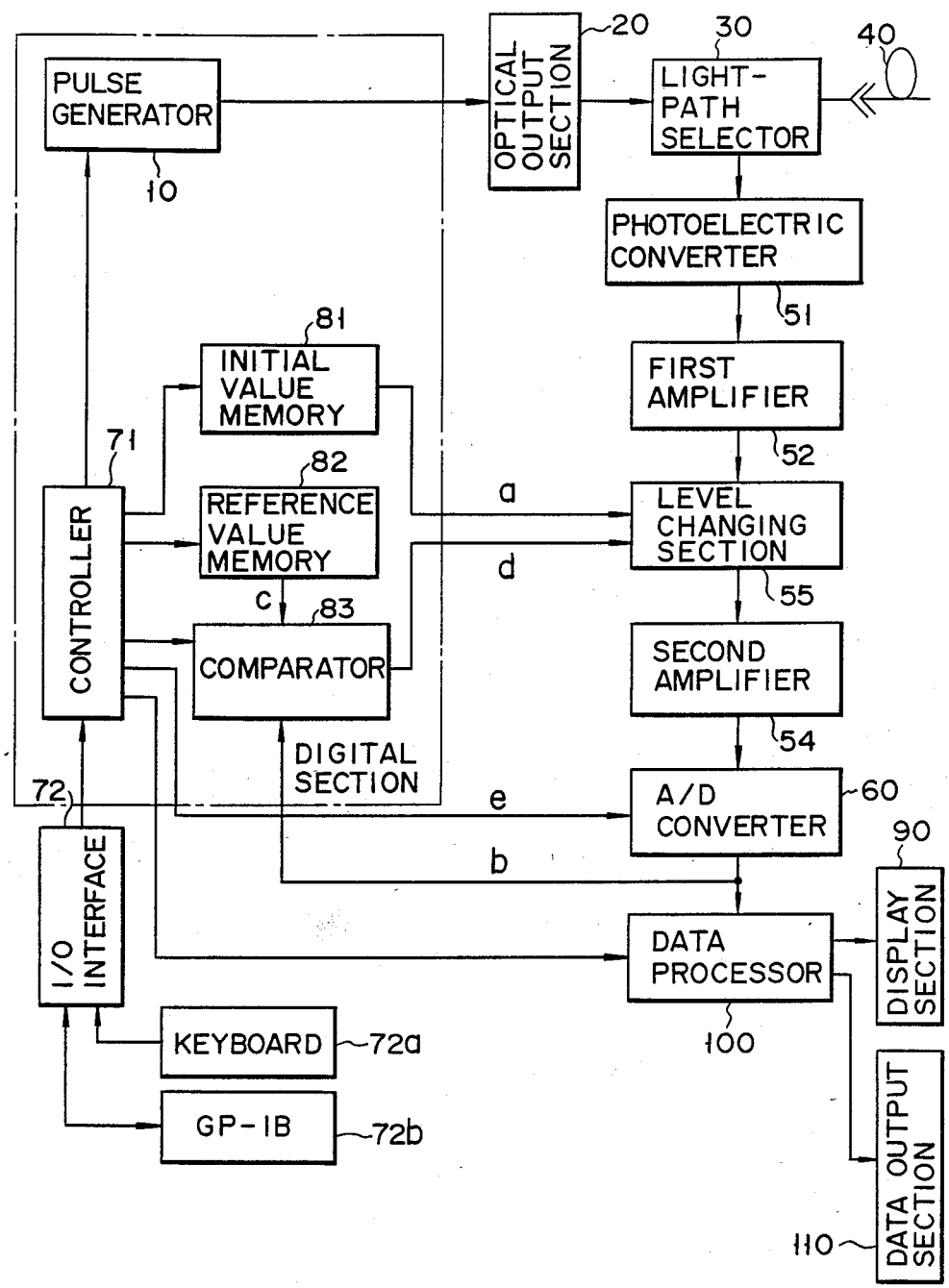
F I G. 4

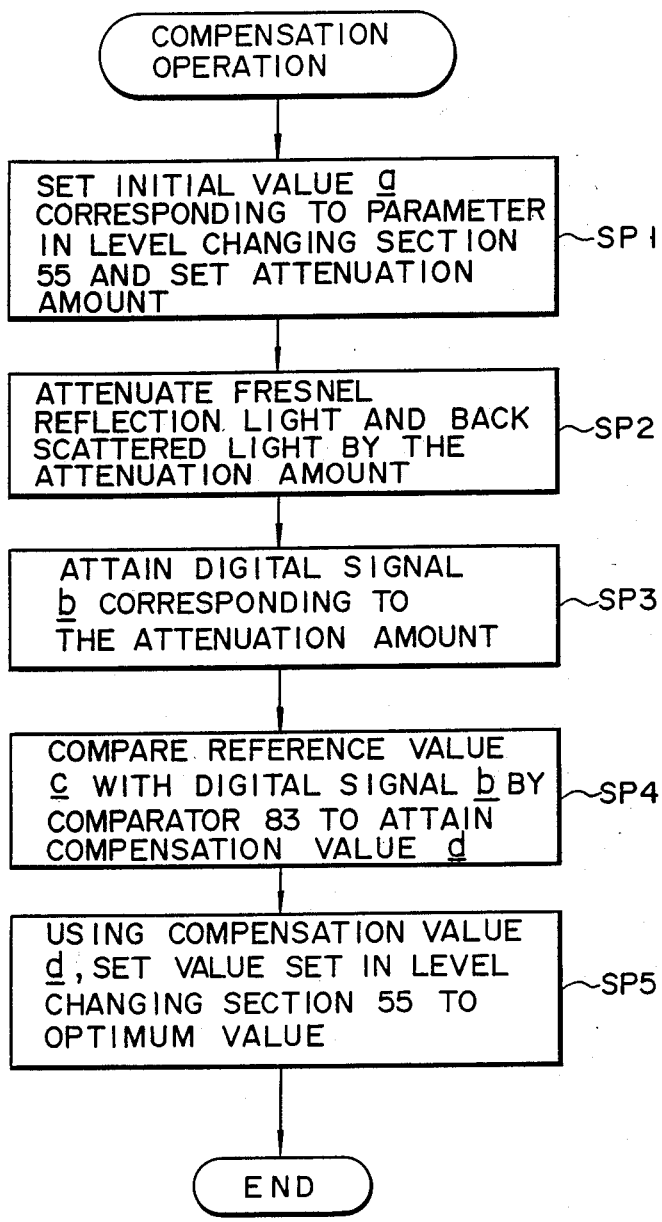
F I G. 6

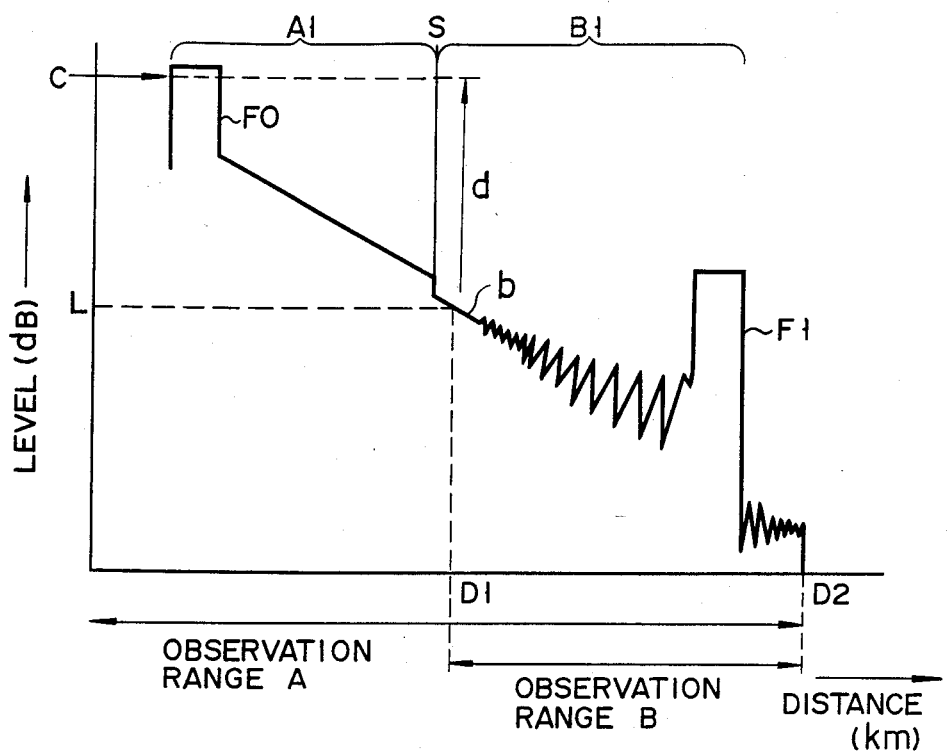
F I G. 7
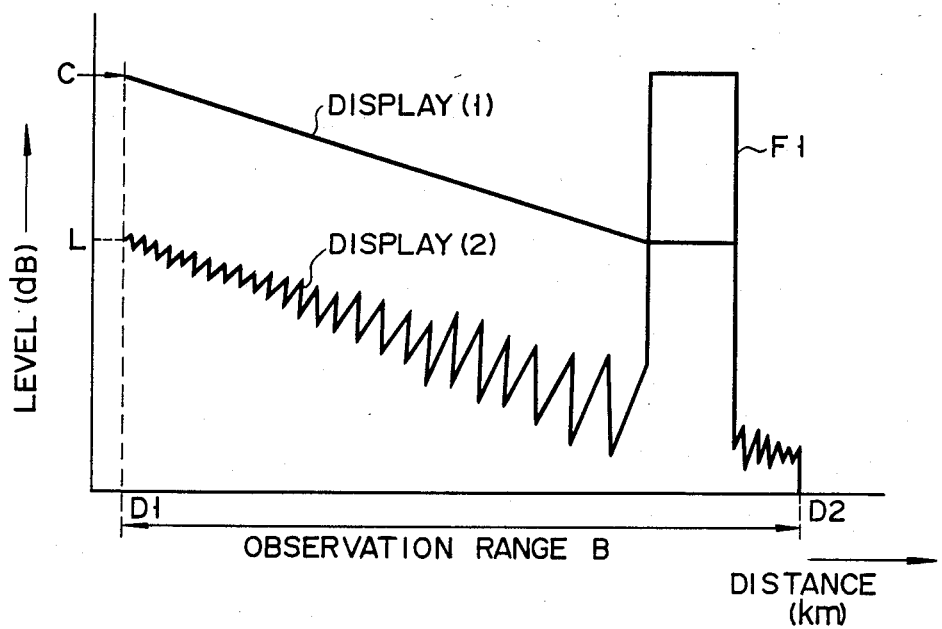
F I G. 8

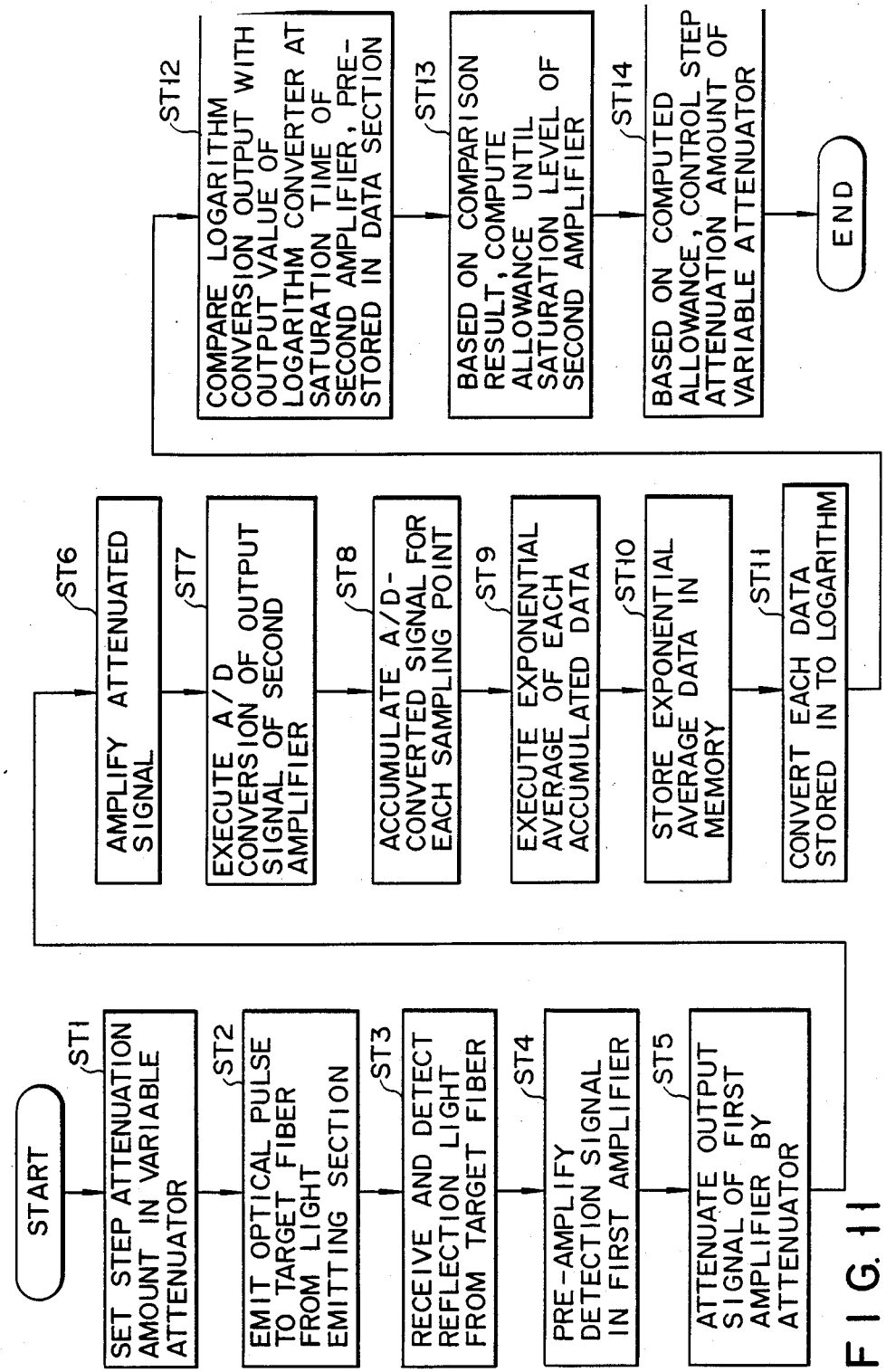
F I G. 11

OPTICAL TIME DOMAIN REFLECTOMETER WITH LEVEL ADJUSTING FUNCTION

BACKGROUND OF THE INVENTION

1. Field of the Invention

This invention relates to an optical time domain reflectometer with an automatic level adjusting function and, more particularly, to an optical time domain reflectometer which detects backscattered light and Fresnel reflection light, generated by an optical pulse sent to a target optical fiber and returning from the fiber, to thereby measure the loss, and find a crack or cut point, in the target optical fiber.

2. Description of the Related Art

A conventional optical time domain reflectometer tests a target optical fiber by sending an optical pulse to the target optical fiber and detecting Fresnel reflection light and backscattered light returning from the fiber.

FIG. 1 schematically illustrates the arrangement of this optical time domain reflectometer. In the figure, reference numeral 10 is a pulse generator for generating a pulse signal, 20 is an optical output section for generating an optical pulse according to the pulse signal, and 30 is a light-path switching section for sending the optical pulse to target optical fiber 40 and extract Fresnel reflection light and backscattered light returning toward the pulse-launching end of the fiber from inside the fiber; a directional coupler is used as this component 30 in this example. Reference numeral 51 is a photoelectric converter for converting Fresnel reflection light and backscattered light into an electric signal, 52 is a first amplifier for amplifying the electric signal, 53 is a variable resistance attenuator, 54 is a second amplifier for amplifying an electric signal from this attenuator 53, 60 is an A/D converter for converting the electric signal into a digital signal, 90 is a display section, and 100 is a data processor.

FIG. 2 gives a typical characteristic of a target optical fiber which is acquired by the above arrangement, and it shows level (dB) on the vertical scale and distance (km) on the horizontal scale with $F_0$ indicating Fresnel reflection occurred at the pulse-launching end of target optical fiber 40 and $F_1$ indicating Fresnel reflection occurred at the other end. Characteristic A is of the backscattered light and its inclination indicates the light transmission characteristic of target optical fiber 40. S1 to S4 indicate spliced points of target optical fiber 40 by fusion splicing.

In the above arrangement, variable resistance attenuator 53 attenuates an electric signal which is attained by photoelectric conversion of reflection light that is determined by the type of target optical fiber 40, observation range, and the pulse width, wavelength and output level of an optical pulse from optical output section 20, to thereby prevent saturation of the electric signal in second amplifier 54. With the conventional optical time domain reflectometer, while visually confirming on the screen of display section 90 that the electric signal is not saturated in second amplifier 54, an operator manually changes and adjusts the amount of attenuation made by variable resistance attenuator 53 in such a manner that the upper left part of the characteristic curve A of target optical fiber 40 does not exceed, for example, a reference value C in FIG. 2.

This will be discussed in more detail below. The measured waveform or characteristic of a target optical fiber has its level gradually decreasing as the measured distance gets farther and locally includes high-level of pulse or the like fresnel reflection. The operator may also use a function to partially enlarge or reduce the observation range as one of variable parameters. Accordingly, the operator should operate the variable resistance attenuator 53 in view of which parameter is to be changed.

With the above optical time domain reflectometer, in converting the Fresnel reflection light and backscattered light from target optical fiber 40 into an electric signal and supplying the signal to A/D converter 60 after amplifying it, if the operator erroneously sets larger the attenuation amount for variable resistance attenuator 53, a reduction in level of the electric signal would impair the S/N ratio. To improve the S/N ratio, therefore, data processor 100 requires a significant amount of time in executing an averaging process.

On the other hand, if the attenuation amount for variable resistance attenuator 53 is set small, the electric signal is saturated in second amplifier 54 so that the Fresnel reflection light and backscattered light from target optical fiber 40 cannot be observed with fidelity.

Further, if the operator is a novice, he should have difficulty in discriminating whether or not a variable attenuation amount set by him is the proper one and should unnecessarily take time in setting the proper attenuation amount, resulting in inefficient measurement.

With the attenuation amount set different from the proper value, even when sampling is done to the same target optical fiber using the same parameter excluding this attenuation amount, there occurs a difference in S/N ratio of sampled signal levels and a variation in measurement results. Therefore, if the sampling is performed with the properly set attenuation amount and a high S/N ratio of the signal levels, the result of the sampling would have a high accuracy, whereas if the sampling is done with an improperly set attenuation amount and a low S/N ratio, it would result in a low accuracy, thus impairing the reproducibility of the sampling result. In manually setting the attenuation amount, because of a difference in operators' ability, the accuracy of the sampling results may vary or the reproducibility of the sampled results may be impaired depending on the operator, thus resulting in a low reliability.

FIG. 3 is a block diagram illustrating another arrangement of the optical time domain reflectometer which has been actually used.

This optical time domain reflectometer comprises a timing generator 1, a light emitting section 2, a directional coupler 3, a light receiving section 4, an amplifying section 5, an A/D converter 6, an accumulator 7, a display section 8 and a data processor 9. Based on a trigger signal outputted from timing generator 1, light emitting section 2 sends an optical pulse to target optical fiber 10. This pulse generates backscattered light and Fresnel reflection light in target optical fiber 10, which are in turn received by the optical time domain reflectometer. The received backscattered light and Fresnel reflection light are amplified by amplifying section 5 and are then subjected to A/D conversion in A/D converter 6. The output of A/D converter 6 is accumulated in accumulator 7 for each sampling point. Further, each accumulated data is subjected to logarithm conversion in data processor 9 and is then displayed on display section 8, thereby carrying out various characteristic measurements such as measuring of the loss of target optical fiber 10 and finding any cut or cracked section thereof.

With the use of the above conventional optical time domain reflectometer, the amplification of the backscattered light and Fresnel reflection light received by light receiving section 4 prior to their A/D conversion in A/D converter 6, is carried out by a combination of first and second amplifiers 5a and 5b with a fixed gain and a manually variable attenuator 5c.

With the above optical time domain reflectometer, however, if the operator sets the attenuation amount for attenuator too large at the time the received backscattered light and Fresnel reflection light are amplified and transferred to A/D converter 6, the signal decreases, resulting in a low S/N ratio. Data processor 9 therefore requires extra averaging time in order to improve the S/N ratio. If the attenuation amount for attenuator 5c is set too small, on the other hand, the signal is saturated in amplifier 5b, so that the reflection light from target optical fiber 10 will not be observed. Particularly, if the operator is a novice, he should have difficulty in discriminating whether or not a variable attenuation amount set by him is the proper one and should need much time in setting the proper attenuation amount, resulting in inefficient measurement. Further, because of a difference in operators' ability, there would be a variation in the attenuation amount set for attenuator 5c depending on the operator, thus resulting in a low reliability of the sampled values.

Since the operator needs to view the screen of display section 90 to determine the proper attenuation amount, it is not always possible to set the attenuation amount to the proper value under the unattended control of an external controller.

SUMMARY OF THE INVENTION

Accordingly, it is an object of this invention to provide a new and improved optical time domain reflectometer with an automatic level adjusting function in which, even when a parameter for observing Fresnel reflection light and backscattered light from a target optical fiber is altered, an electric signal is not saturated and the proper attenuation amount can automatically be set, thus minimizing a variation in sampled results due to a different in operators' ability, simplifying the overall operation and facilitating the application of this apparatus to unattended sampling under the control of an external controller.

It is another object of this invention to provide an optical time domain reflectometer which can shorten the averaging time, eliminates an error in sampled values originating a different in operators' ability, is very easy to operate and can perform measurement unattended under the control of an external controller with high efficiency and accuracy.

According to one aspect of this invention, there is provided an optical time domain reflectometer comprising:

optical pulse supplying means for supplying an optical pulse to a target optical fiber;

reflection light detecting means for outputting an electric signal corresponding to reflection light from the target optical fiber;

level control means for receiving the electric signal from the reflection light detecting means and controlling the electric signal to have a level according to an initial value or a compensation value;

A/D converting means for converting an output of the level control means into a digital signal;

parameter input means for entering a parameter for determining a level indicating reflection light from the target optical fiber;

initial value storage means for storing the initial value to be set in the level control means in accordance with a parameter from the parameter input means;

compensation value computing means comparing the digital signal from the A/D converting means corresponding to the initial value with a reference value and computing the compensation value to be set in the level control means; and processing means for processing the digital signal from the A/D converting means to output the digital signal.

According to another aspect of this invention, there is provided an optical time domain reflectometer for emitting an optical pulse with a given wavelength to a target optical fiber, receiving and photoelectrically converting Fresnel reflection light or backscattered light from the target optical fiber to an electric signal, subjecting the electric signal to A/D conversion and signal processing via an amplifier, and displaying a result of the signal processing or outputting resultant data, which reflectometer comprises:

level changing means for changing a level of the electric signal corresponding to a predetermined location of observation range so as to avoid saturation of the electric signal in the amplifier;

A/D converter for subjecting an output signal of the level changing means to A/D conversion;

I/O (input/output) means for entering a parameter for determining a level of the Fresnel reflection light or backscattered light from the target optical fiber;

initial value storage means for storing an initial value to be set in the level changing means based on the parameter;

reference value storage means for preliminary storing a pre-set reference value to be compared with an output value of the A/D converter as attained after setting the initial value in the level changing means; and comparing means for comparing the output value of the A/D converter attained after setting the initial value in the level changing means with the reference value stored in the reference value storage means, and computing a compensation value for changing the initial value set in the level changing means.

According to this invention, the type of a target optical fiber and setting of each parameter for an optical time domain reflectometer to test the target optical fiber are entered through the I/O means, and an initial value for the level changing means which is determined by the parameter is read out from the initial value storage means and is set in the level changing means. Then, an optical pulse with a given wavelength is launched to the target optical fiber, Fresnel reflection light or backscattered light from the target optical fiber is received and converted into an electric signal, which is in turn supplied to the A/D converter. The output value of this A/D converter is compared with a reference value stored in advance in the reference value storage means, and the initial value set in level changing means is changed according to the comparison result. Accordingly, it is possible to measure or test the target optical fiber within a wide dynamic range with the proper attenuation amount, i.e., the minimum attenuation amount required to avoid signal saturation.

According to a further aspect of this invention, there is provided an optical time domain reflectometer comprising:

a first amplifier for amplifying reflection light received from a target optical fiber which is generated by supplying an optical pulse to the target optical fiber;

a variable attenuator for attenuating an output signal of the first amplifier to a given level with a pre-set attenuation amount;

a second amplifier for amplifying a signal attenuated by the variable attenuator;

an A/D converter for subjecting an output signal of the second amplifier to A/D conversion;

an accumulator for accumulating the A/D-converted output signal for each sampling point;

an averaging section for subjecting each data accumulated by the accumulator to exponential average;

a memory for storing each data subjected to exponential average in the averaging section;

a logarithm converter for subjecting each data stored in the memory to logarithm conversion;

a comparator for comparing an output value of the logarithm converter based on a logarithm conversion result with an output value of the logarithm conversion result based on the attenuation amount for the variable attenuator at a saturation time of the second amplifier, which is stored in advance in a storing section;

an arithmetic unit for computing an allowance for an output level with respect to a saturation level of the second amplifier based on a comparison result of the comparator; and a controller selecting a desired attenuation amount for the variable attenuator to vary the attenuation amount based on the allowance computed by the arithmetic unit.

According to this invention, when an optical pulse is supplied to a target optical fiber, reflection light from the fiber is received by a light receiving section. The received reflection light is amplified by the first amplifier and is attenuated by the variable attenuator to an input level of the second amplifier with a step attenuation amount initially set in the variable attenuator. The attenuated signal is amplified again with a given gain by the second amplifier. This amplified signal is sequentially accumulated for each sampling point after its A/D conversion. Each accumulated data is subjected to exponential average and is temporarily stored in the memory before it is subjected to a logarithm conversion in the logarithm converter. The output value of the logarithm converter is compared with that output value of the averaging section attained at the time the second amplifier is saturated based on the initially set step attenuation amount. Based on the comparison result, the arithmetic unit computes an allowance for the output level with respect to the saturated level of second amplifier. And, based on the computed allowance, the controller selects the optimum step attenuation amount for the variable attenuator.

BRIEF DESCRIPTION OF THE DRAWINGS

These and other objects and features of the present invention can be understood through the following embodiments with reference to the accompanying drawings, in which:

FIG. 4 is a block diagram of an optical time domain reflectometer according to the first embodiment of this invention;

FIG. 6 is a flowchart illustrating a compensation operation of the optical time domain reflectometer;

FIGS. 7 and 8 are characteristic graphs for a target optical fiber for explaining the compensation operation of this optical time domain reflectometer;

FIG. 11 is a flowchart for this optical time domain reflectometer.

DETAILED DESCRIPTION OF THE PREFERRED EMBODIMENT

Figure 1:
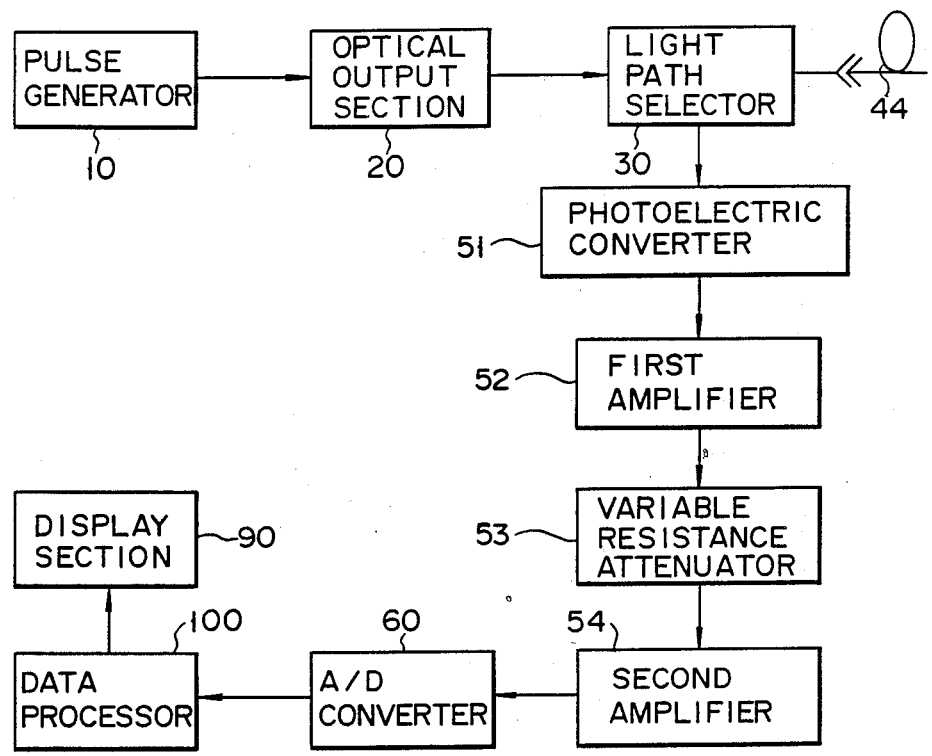
FIG. 1 is a block diagram of a conventional optical time domain reflectometer.

FIG. 4 is a block diagram of an optical time domain reflectometer according to the first embodiment of this invention, which has an automatic level changing function for properly setting the level of an input signal to an A/D converter by emitting an optical pulse to a target optical fiber and detecting Fresnel reflection light and backscattered light returning to the pulse-launching end of the target optical fiber from within the fiber. In the figure, the components denoted by reference numerals 10, 20, 30, 40, 51, 52, 54, 60, 90 and 100 are the same as those of the conventional optical time domain reflectometer of FIG. 1 which are denoted by the same numerals, so that their description will be omitted.

Reference numeral 55 is a level changing section for changing the level of an electric signal from first amplifier 52, and, in this example, it is a variable resistance attenuator which takes attenuation amounts $AT_0$, $AT_1$, ... $AT_{n-1}$, $AT_n$ ($AT_0 > AT_1 > ... > AT_{n-1} > AT_n$). The level changing section 55 has its attenuation amount changed by its digital input. In this case, first amplifier 52, level changing section 55 and second amplifier 54 may be replaced by a single variable gain amplifier. Reference numeral 72 is an I/O interface for entering various parameters for determining the level of the Fresnel reflection light and backscattered light from the target optical fiber. In this embodiment, parameters such as the type of target optical fiber 40, the observation range, and the pulse width, wavelength and level of an optical pulse from optical output section 20, are inputted to the I/O interface 72 through a keyboard 72a or GP-IB 72b.

Figure 5:
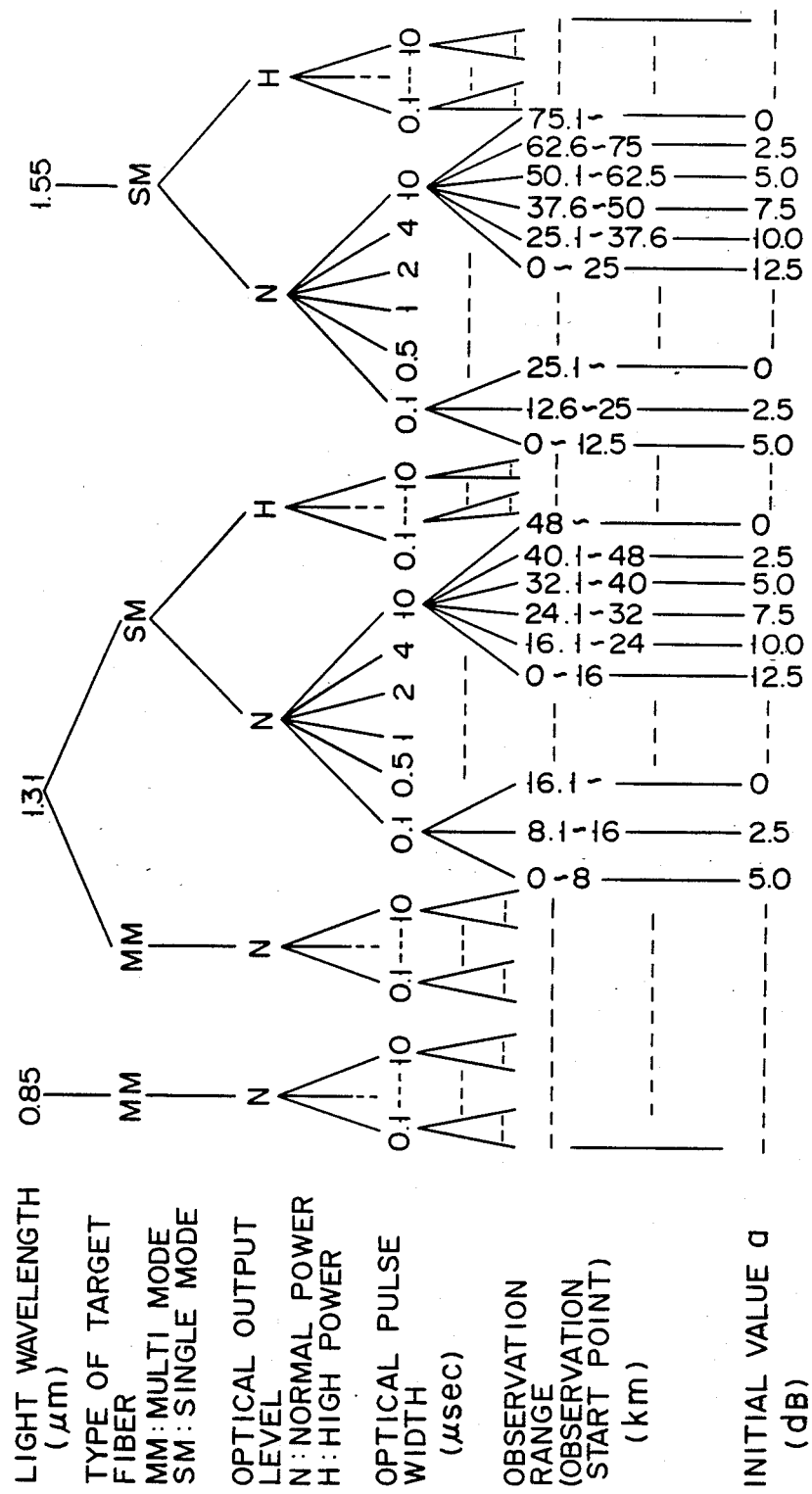
FIG. 5 is a diagram illustrating the tree structure for determining an initial value a as used in the optical time domain reflectometer of FIG. 4.

Reference numeral 81 is an initial value memory which stores an initial value a as determined by controller 71 from on the tree structure shown in FIG. 5 in order to set the initial value a in level changing section 55, based on the parameters inputted to I/O interface 72.

According to this embodiment, as should be understood from the typical display examples shown in FIG. 7 (which will be described later), the characteristic of target optical fiber 40 is decreasing rightward except for jointed or spliced points S and Fresnel reflection F0 having a width corresponding to the pulse width of an optical pulse from optical output section 20 occurs at the pulse-launching end of target optical fiber 40. Accordingly, the initial value a as determined in view of the above points are stored in advance in initial value memory 81.

In other words, initial value memory 81 stores a plurality of set values (attenuation amounts of level changing section 55) corresponding to a given attenuation characteristic (the mentioned rightward-decreasing characteristic curve) for every given distance, as the attenuation characteristics of a typical optical fiber, as shown in FIG. 5. This attenuation characteristic curve varies depending on the type of the parameters. For instance, for different wavelengths of light, the inclination of the overall characteristic curve varies the width of the Fresnel reflection part also varies by the pulse width of output light and the level of the characteristic curve vertically shifts. As will be described later, only a given observation range is enlarged or reduced by a change in observation range. Further, with regard to the level of light, there are parameters corresponding to units which, even with the same wavelength, have different output powers from the LD.

Reference numeral 82 is a reference value memory for storing a pre-set reference value c to be compared with the output value of A/D converter 60 which is attained after setting the initial value in level changing section.

According to this embodiment, as shown in FIGS. 7 and 8, the reference value c is set to a value slightly smaller than the output value of A/D converter 60 for the case where he electric signal is saturated by amplifier 54. This determines the upper limit for maximizing the dynamic range.

Reference numeral 83 is a comparator for comparing the reference value with the output value of A/D converter 60 which is attained after setting the initial value in level changing section 55 and computing a compensation value for compensating the attenuation (initial) value set in level changing section 55 to be the optimum value.

Controller 71 controls pulse generator 10, A/D converter 60, initial value memory 81, reference value memory 82, comparator 83 and data processor 100 based on various parameters inputted to I/O interface 72. In changing the observation range, controller 71 changes, through the control line e, the time between the point at which a pulse with a constant interval is generated from pulse generator 10 and the point at which A/D converter 60 starts receiving data. The data processor 100 selectively execute a display process to display section 90 or a remote-controlled data output from data output section 110.

A description will now be given of the sequence of operation of this embodiment with reference to the flowchart of FIG. 6.

FIG. 7 shows the results of the optical time domain reflectometer measuring the target optical fiber which is attained by fusion splicing optical fibers A1 and B1 at a point S. Here, the range for observation is observation range A. FIG. 8 illustrates in enlargement the measuring results for only that portion of the target optical fiber which corresponds to observation range B in FIG. 7. Level L and distances D1 and D2 in FIG. 7 equal those in FIG. 8.

In changing the observation range of the optical time domain reflectometer from observation range A to observation range B, controller 71 automatically changes the set value (attenuation amount) of level changing section 55 in the following sequence.

(A) When various parameters are set in I/O interface 72, an operation for compensating the set value starts.

(B) As an initial value to be set in level changing section 55 which is stored in initial value memory 81, the initial value a corresponding to the parameter stored in I/O interface 72 is read out from the memory 81 and is set in level changing section 55 (step SP1).

With regard to enlargement of only a given observation region to be compensated, as optical level L1' corresponding to distance D1' stored in initial value memory 81 can be anticipated, a set value (attenuation amount) a for attaining the minimum S/N signal level required for comparator 83 to compare the reference value with the level of the received light after A/D conversion which corresponds to the level L1' is read out from memory 81.

(C) Then, pulse generator 10 generates an electric pulse signal and optical output section 20 outputs an optical pulse according to the electric pulse signal. The optical pulse is sent through optical-path selector 30 to target optical fiber 40, and Fresnel reflection light and backscattered light coming to the pulse-launching end of target optical fiber 40 from within the fiber is guided to photoelectric converter 51 by means of the selector 30.

Figure 2:
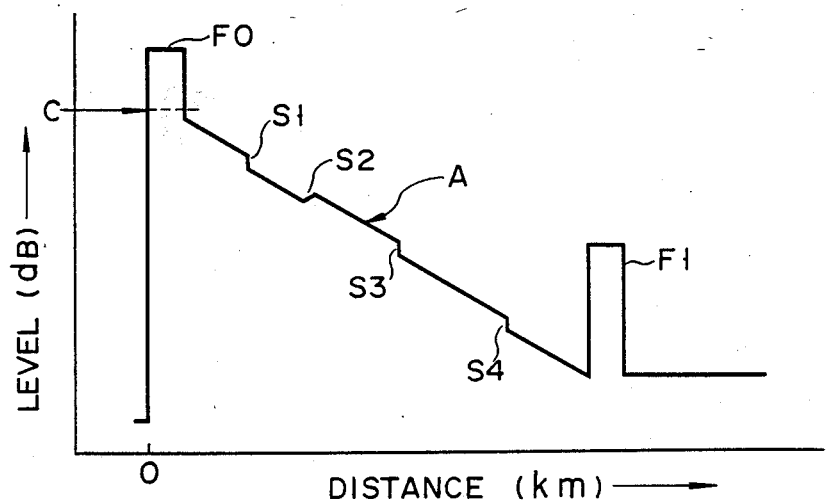
FIG. 2 is a graph illustrating a typical optical fiber characteristic.
Figure 3:
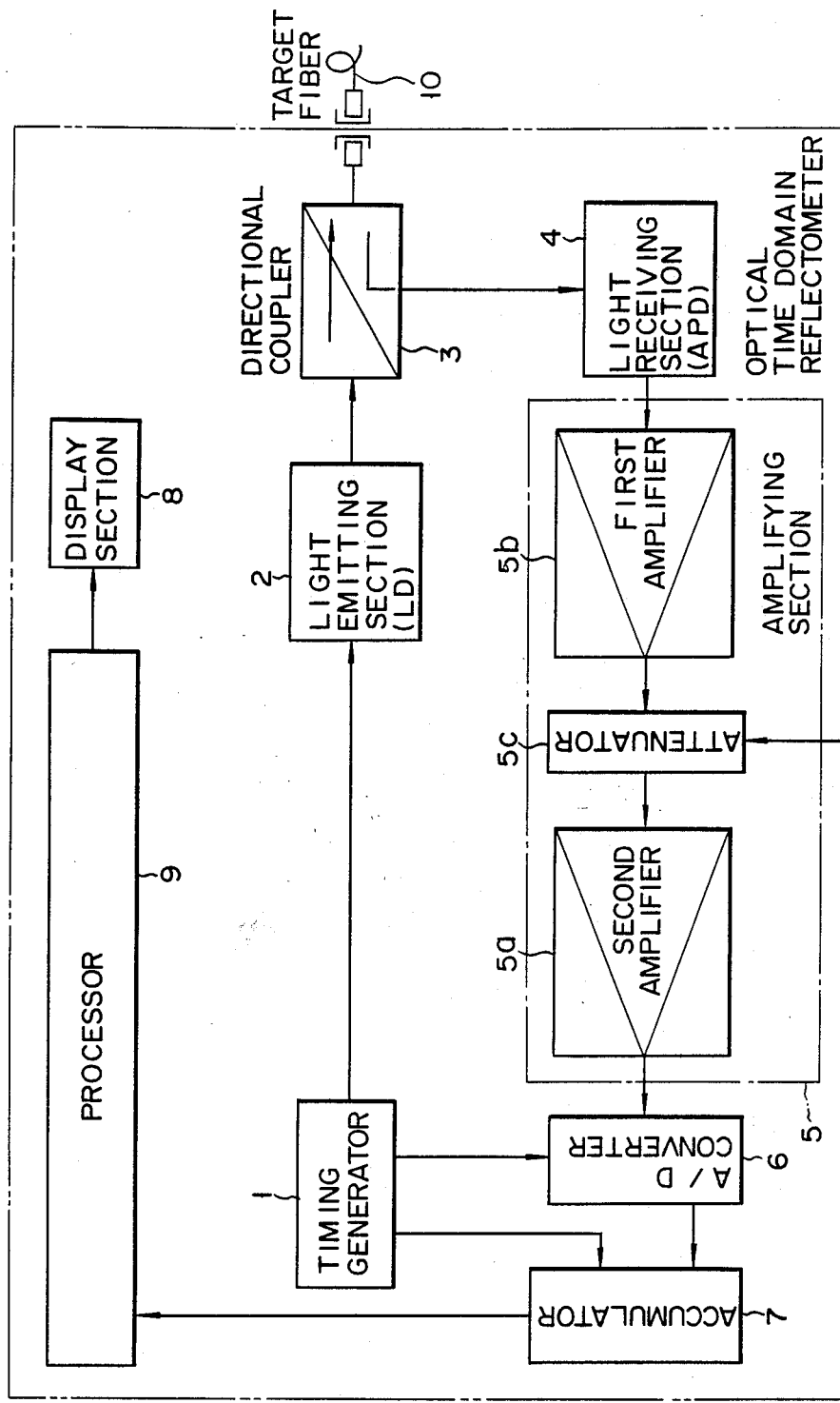
FIG. 3 is a block diagram exemplifying the arrangement of another optical time domain reflectometer.

(D) The fresnel reflection light and backscattered light are converted into an electric signal in photoelectric converter 51, the electric signal is amplified by amplifier 52 and is then attenuated by level changing section 55 in which the initial value a read out from initial value memory 81 is set, and the attenuated signal is amplified again by amplifier 54 (step SP2). As the characteristic curve of the target optical fiber declines rightward as shown in FIG. 2, the electric signal corresponding to the middle point at the proximity of the pulse-launching end of the target optical fiber within the observation range is converted into a digital signal b by A/D converter 60 (step SP3).

Figure 9A:
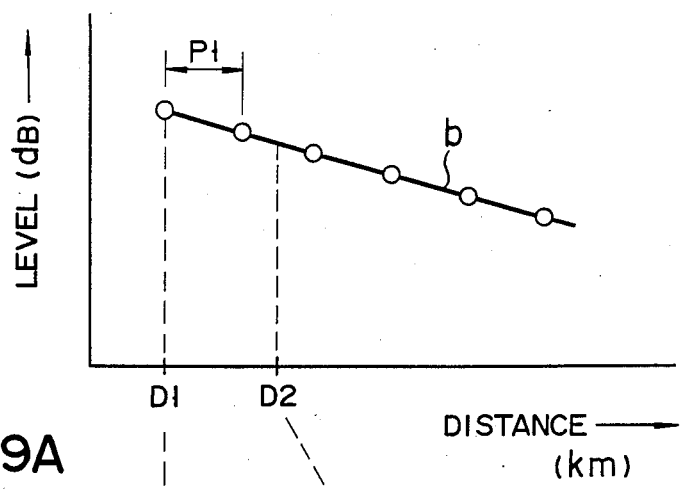
FIGS. 9A and 9B are diagrams illustrating different sampling intervals of a digital signal b.
Figure 9B:
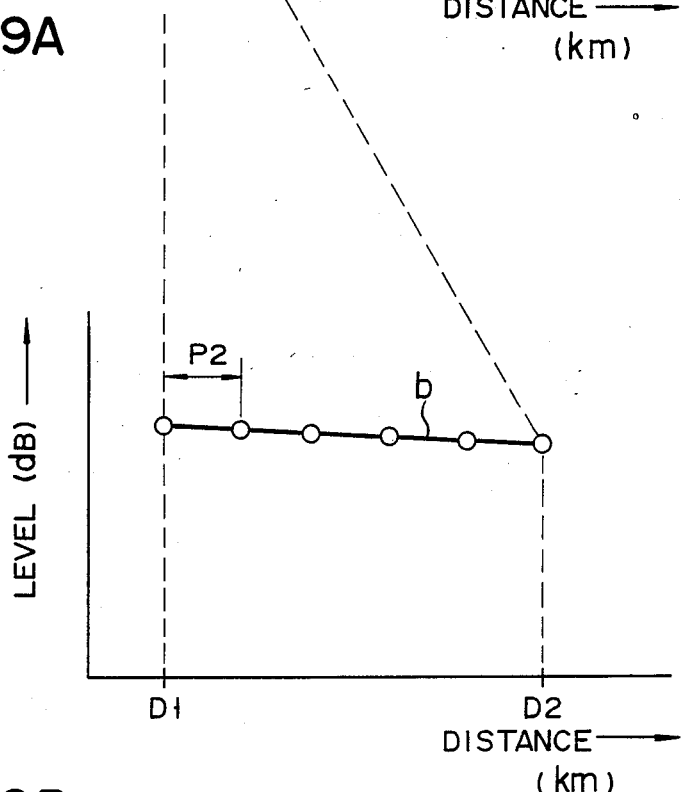

To improve the accuracy of this digital signal b, the signal b is attained by taking the average of the digital signal obtained between distances D1 and D2 within the observation range at a sampling interval P1 as shown in FIG. 9A and the digital signal obtained at a sampling interval P2 narrower than P1 as shown in FIG. 9B. This digital signal b is the output of A/D converter 60 which is attained by attenuating the aforementioned electric signal in level changing section 55 which is pre-set with the initial value a, and it is provided for comparison with the reference value c which is carried out hereafter.

(E) Then, comparator 83 compares the digital signal b with the reference value c stored in reference value memory 82 and computes a compensation value d for setting the proper set value for level changing section 55 according to the condition, $c-b<AT_n-AT_{n-1}$, and the resultant data is supplied to level changing section 55.

Here, as shown in FIG. 7, comparator 83 compares the reference value c with the digital signal b corresponding to an as left portion of characteristic A of target optical fiber 40 as possible within the observation range, which portion does not include the Fresnel reflection $F_0$ to attain the compensation value d (step SP4), and automatically sets the set value (attenuation amount) of level changing section 55 based on the compensation value d (step SP5).

At the time the compensation operation is performed for the observation range that includes Fresnel reflection $F_0$, the influence of the Fresnel reflection $F_0$ can be removed by changing the parameter (for the optical pulse width) inputted to I/O interface 72.

(F) through the above process, the setting of the proper value for level changing section 55 is completed, and the value set in level changing section 55 will not be changed by the compensation value d attained by the above operation, until a parameter is again set in I/O interface 72. Thereafter, the characteristic of target optical fiber 40 will be measured using the compensated value; the measuring operation itself is the same as the one involved in the conventional optical time domain reflectometer.

If the set value (attenuation amount) of level changing section 55 is not altered at the time the observation range for the optical time domain reflectometer is changed from observation range A to B, the observation results would be display (2) shown in FIG. 8. As described earlier, when the observation range is altered in the conventional optical time domain reflectometer, the set value for variable resistor attenuator 53 should be manually varied by an operator for each alteration to render the measuring results in a state with a high S/N ratio as indicated by display (1) in FIG. 8.

According to this embodiment, when the above alteration of the observation range is effected, the observation range start point D1 is inputted to I/O interface 72, and the initial value a as determined by a combination of parameters including this observation range start point D1 is read out from initial value memory 81 and set in level changing section 55, then the operations (C) to (F) are performed. This method can always adjust the set value of level changing section 55 to the proper value and can permit an observation of the measured waveform with a high level and high S/N ratio, as indicated by display (1) in FIG. 8.

The aforementioned automatic compensation can be executed by providing an external controller, coupled to I/O interface, at a remote place from the optical time domain reflectometer and inputting a parameter to this external controller. This method can easily apply to unattended measuring of target optical fiber 40 at a remote place where this fiber is laid.

As shown in FIG. 2, the target optical fiber should normally be laid over a long distance in actual use and should therefore be spliced at many points. The level of an optical signal significantly varies at those points, thus conventionally requiring time to test the target optical fiber. According to the present optical time domain reflectometer, however, the level of the received Fresnel reflection light and backscattered light within any observation range are predicted and pre-adjusted, and even if the level is found in the comparing operation to be beyond the anticipated level, the level can be automatically set to the proper value accordingly.

With the use of the optical time domain reflectometer according to the first embodiment of this invention, even when a parameter for observing Fresnel reflection light and backscattered light from a target optical fiber is changed, the aforementioned electric signal will not be saturated and the proper attenuation amount can be automatically set, thus minimizing a variation in measured results due to a difference in operators' ability and ensuring the simplification and shortening of the required operation as well as reducing the man power involved in the operation. In addition, automatic testing can be realized by allowing for a level variation at jointed points in a real line. Further, the present optical time domain reflectometer can easily be applied to unattended testing of the target optical fiber under the control of an external controller.

Figure 10:
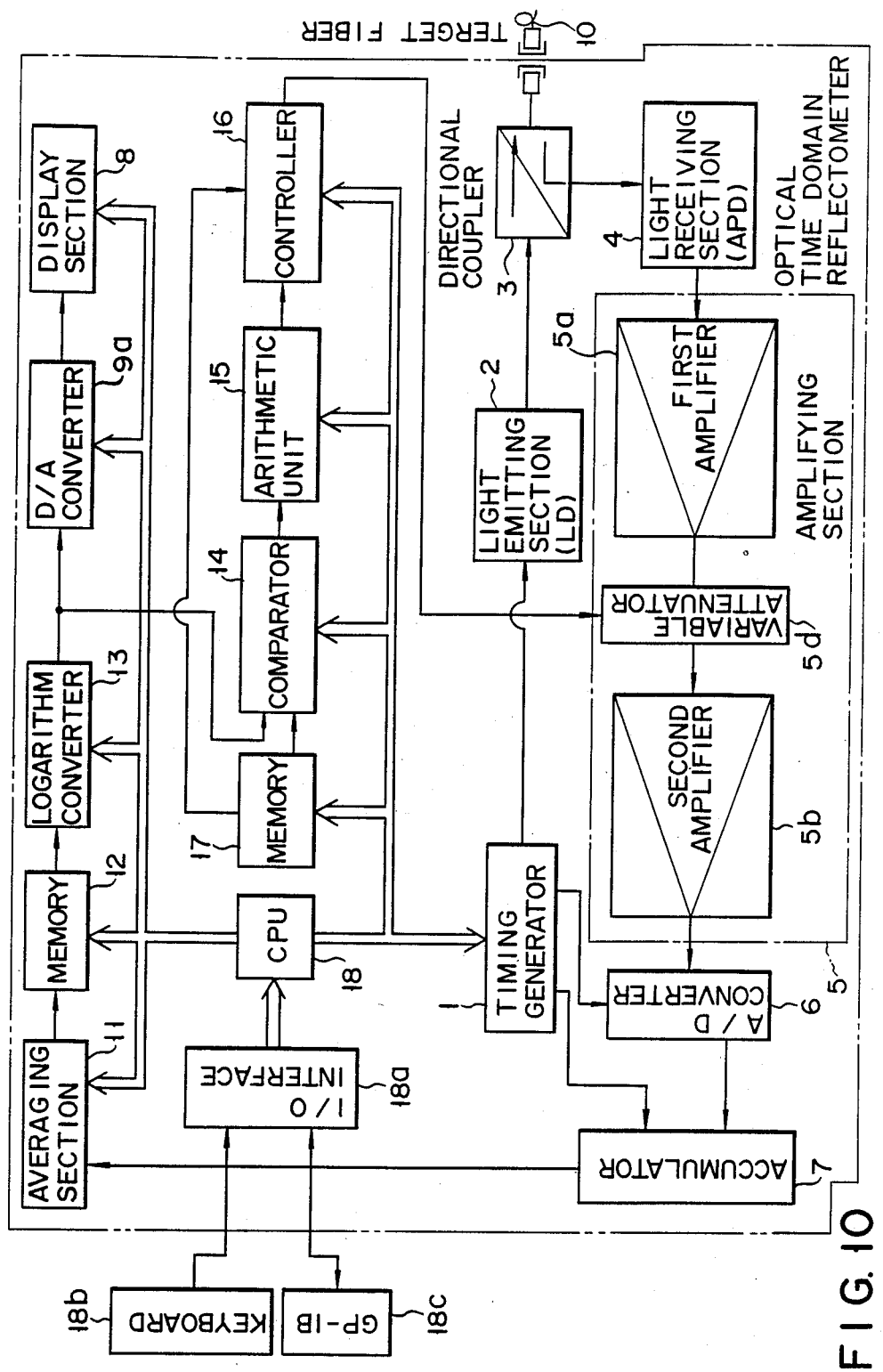
FIG. 10 is a block diagram illustrating a modification of the optical time domain reflectometer of this invention.

FIG. 10 is a block diagram illustrating the arrangement of an optical time domain reflectometer according to the second embodiment of this invention.

In the following description, the same reference numerals are used for the second embodiment to denote the identical or corresponding components of the first embodiment, thereby omitting their explanation.

The optical time domain reflectometer according to this embodiment comprises a timing generator 1, a light emitting section 2, a directional coupler 3, a light receiving section 4, an amplifying section 5 having first and second amplifiers 5a and 5b, and a variable attenuator 5d, an A/D converter 6, an accumulator 7, an averaging section 11, a memory 12, a logarithm converter 13, a D/A converter 9a, a display section 8, a memory 17, a comparator 14, an arithmetic unit 15, a controller 16 and a CPU 18. This reflectometer receives backscattered light and Fresnel reflection light reflected from target optical fiber 10 as a result of supplying an optical pulse to the fiber 10, amplifies and A/D-converts the received signal in amplifying section 5, and accumulates, and subjects, the resultant data to exponential average for each sampling point, and then logarithm-converts and D/A-converts the resultant data and displays it in the form of waveform on display section 8. The attenuation amount for variable attenuator 5d in amplifying section 5 is automatically controlled to be the optimum value by subjecting the data prestored in memory 17 to comparison and arithmetic operation with the output value of logarithm converter 13 by means of comparator 14, arithmetic unit 15 and controller 16.

CPU 18, like controller 17 of the first embodiment, receives an input from I/O interface 18a and controls timing generator 1, display section 8, averaging section 11, memory 12, logarithm converter 13, comparator 14, arithmetic unit 15, controller 16 and memory 17.

Timing generator 1 generates a trigger signal to excite the light emitting element of light emitting section 2 (e.g., a laser diode: LD) and a sampling pulse to drive A/D converter 6 and accumulator 7.

Based on the trigger signal from timing generator 1, light emitting section 2 outputs an optical pulse which is emitted through directional coupler 3 to target optical fiber 10.

Directional coupler 3 leads to light receiving section 4 the backscattered light and Fresnel reflection light reflected from target optical fiber 10 as a result of the supplying of the optical pulse to the fiber from light emitting section 2.

Light receiving section 4 may be constituted by an avalanche photodiode (APD), and receives and detects the backscattered light and Fresnel reflection light from target optical fiber 10 led by directional coupler 3. Amplifying section comprises first amplifier 5a, variable attenuator 5d and second amplifier 5b. The first amplifier 5a at the first stage amplifies the detection signal from light receiving section 4 by a given amplification. Variable attenuator 5d, which is pre-set with the step attenuation amount including the initial value stored in memory 17 and determined by various parameters as per the first embodiment, attenuates the input level of the amplified signal to second amplifier 5b. The attenuated signal is amplified by second amplifier 5b at the next stage by a given amplification, and this amplified signal is supplied to A/D converter 6.

A/D converter 6 performs A/D conversion of the output signal of second amplifier 5b based on the timing pulse from timing generator 1, and sends it to accumulator 7.

Also based on the sampling pulse from timing generator 1, accumulator 7 sequentially accumulates the A/D-converted signal for each sampling point of target optical fiber 10 and sends the accumulated signal to averaging section 11.

Averaging section 11 sequentially subjects each accumulated data to exponential average and each of the resultant data is stored in memory 12.

Logarithm converter 13 converts each data (signal level) stored in memory 12 for each sampling point of target optical fiber 10 into logarithm conversion data and sends the logarithm conversion data to display section 8, so that the logarithm conversion result from logarithm converter 13 is displayed in the form of waveform on display section 8 via D/A converter 9a. The output signal of logarithm converter 13 is also supplied to one input terminal of comparator 14.

Memory 17 pre-stores data for determining attenuation amount for variable attenuator 5d which is set at the beginning of the measurement to the compared with the output value of logarithm converter 13 that is outputted based on the reflection light to be detected, i.e., the step attenuation amount of the variable attenuator 5d which renders second amplifier 5b in the unsaturated state, on the basis of the wavelength and pulse width of the light emitting element in light emitting section 2, the type of target optical fiber 10 to be tested, and observation position and range of the fiber 10. The output value of logarithm converter 13 at the time second amplifier 5b is saturated is stored for each step attenuation amount as the grand level of the input signal of A/D converter 6 differs from each step attenuation amount.

Comparator 14 compares the signal outputted from logarithm converter 13 by the detection of the reflection light, with the output value of logarithm converter 13 in the saturated state of second amplifier 5b which is based on the initially set step attenuation amount stored in memory 17.

Arithmetic unit 15 computes the allowance for the output level of logarithm converter 13 with respect to the saturated level of second amplifier 5b based on the comparison result from comparator 14.

Based on the allowance obtained by the operation result from arithmetic unit 15, controller 16 selects the desired step attenuation amount for variable attenuator 5d to execute variable control of the attenuation amount.

A description will now be given of thus constituted optical time domain reflectometer according to the flowchart shown in FIG. 11.

First, based on parameters such as the wavelength and pulse width of the LD as light emitting section 2, the type, observation position and range of target optical fiber 10, which are entered to CPU 18 through keyboard 18b or GP-IB 18 and I/O interface 18a, data for determining the initial attenuation amount for variable attenuator 5d is read out from memory 17 and the step attenuation amount for variable attenuator 5d is set by controller 16 (step ST1). Under this condition, an optical pulse is sent to target optical fiber 10 from light emitting section 2 based on the trigger signal of timing generator 1 (step ST2). When the optical pulse enters target optical fiber 10, backscattered light and Fresnel reflection light are reflected from the fiber 10 accordingly and are received and detected by light receiving section 4 (step ST3). The detection signal from the section 4 is pre-amplified by first amplifier 5a (step ST4). The amplified output signal of first amplifier 5a is attenuated by variable attenuator 5d by the step attenuation amount set as the initial value (step ST5), and is then amplified to a given level by second amplifier 5b (step ST6). The amplified signal from second amplifier 5b is converted into a digital signal in A/D converter 6 based on the sampling pulse from timing generator 1 (step ST7). The digital signal is then sequentially accumulated by accumulator 7 for each sampling point of target optical fiber 10 (step ST8). Each accumulated data is subjected to exponential average in averaging section 11 (step ST9) before temporary storage in memory 12 (step ST10). Then, each data is read out from memory 12 for logarithm conversion in logarithm converter 13 (step ST11). Each logarithm conversion is displayed in the form of waveform on display section 8 via D/A converter 9a. Subsequently, comparator 14 compares the output value of logarithm converter 13 with the output value of averaging section 13 in the saturated state of second amplifier 5b which is based on the step attenuation amount for variable attenuator 5d stored in advance in memory 17 (step ST12). Based on the comparison result from comparator 14, the allowance for the output level of second amplifier 5b with respect to its saturated level, i.e., a value indicating how small the attenuation amount can be made with respect to the step attenuation amount set as the initial value, is computed (step ST13). Based on the attained allowance, the proper step attenuation amount is selected and is used to control the attenuation amount (step ST14).

According to the optical time domain reflectometer of this embodiment, therefore, the sampling is done using the step attenuation amount set in advance in variable attenuator 5d, the difference between the initially set step attenuation amount and the step attenuation amount for variable attenuator 5d can automatically be set to the proper level, thus reducing the time required for the averaging process without saturating the output of the amplifier depending on the level of the received reflection light and without reducing the S/N ratio. Since the step attenuation amount for variable attenuator 5d can be automatically varied, the operation of the apparatus can be operated significantly easy and a highly-accurate and efficient measurement can be executed irrespective of the different in operators' ability. Although the attenuation amount for variable attenuator 5d varies step by step in the second embodiment, the variable attenuator can serve as well in the case where the attenuation amount continuously varies.

As has been described above, according to the optical time domain reflectometer of the second embodiment, since the step attenuation amount for the variable attenuator can automatically be set and controlled to the proper value, thus minimizing the time required for the averaging process. Further, the automatic variable control of the attenuation amount permits unattended measurement by an external controller and eliminates a measurement error which may be caused by the difference in operators' ability. Therefore, it is possible to conduct an efficient measurement with a high accuracy and improve the operability of the apparatus.

What is claimed is:

1. An optical time domain reflectometer comprising:

optical pulse supplying means for supplying an optical pulse to a target optical fiber;
reflection light detecting means for outputting an electric signal corresponding to reflection light from said target optical fiber;
level control means for receiving said electric signal from said reflection light detecting means and controlling said electric signal to have a level according to an initial value or a compensation value;
A/D converting means for converting an output of said level control means into a digital signal;
parameter input means for entering a parameter for determining a level indicating reflection light from said target optical fiber;
initial value storage means for storing said initial value to be set in said level control means in accordance with a parameter from said parameter input means;
compensation value computing means comparing said digital signal from said A/D converting means corresponding to said initial value with a reference value and computing said compensation value to be set in said level control means; and
processing means for processing said digital signal from said A/D converting means to output said digital signal.

2. The optical time domain reflectometer according to claim 1, wherein said reflection light includes at least one of Fresnel reflection light and backscattered light from said target optical fiber.

3. The optical time domain reflectometer according to claim 1, wherein said level control means includes level changing means in which said initial value or compensation value is set and amplifying means for amplifying said electric signal coming through said level changing means.

4. The optical time domain reflectometer according to claim 3, wherein said reference value is a value corresponding to a level immediately before unsaturation of said amplifying means.

5. The optical time domain reflectometer according to claim 4, wherein said compensation value permits said digital signal from said A/D converting means to be a value corresponding to said reference value.

6. The optical time domain reflectometer according to claim 1, wherein said parameter input means includes at least one of keyboard means and GP-IB means.

7. The optical time domain reflectometer according to claim 1, wherein said processing means includes D/A converting means for outputting an analog signal corresponding to said digital signal from said A/D converting means.

8. The optical time domain reflectometer according to claim 7, further comprising display means for displaying said analog signal from said D/A converting means.

9. The optical time domain reflectometer according to claim 1, wherein said parameter input means inputs, as parameters, light wavelength, a fiber type, an optical output level, optical pulse width and an observation range, which are associated with said target optical fiber.

10. The optical time domain reflectometer according to claim 9, wherein said initial value is determined a tree structure associated with said parameters inputted through said parameter input means.

11. An optical time domain reflectometer for emitting an optical pulse with a given wavelength to a target optical fiber, receiving and photoelectrically converting Fresnel reflection light or backscattered light from said target optical fiber to an electric signal, subjecting said electric signal to A/D conversion and signal processing via an amplifier, and displaying a result of said signal processing or outputting resultant data, said reflectometer comprising:
level changing means for changing a level of said electric signal corresponding to a predetermined location of observation range so as to avoid saturation of the electric signal in the amplifier;
A/D converter for subjecting an output signal of said level changing means to A/D conversion;
I/O (input/output) means for entering a parameter for determining a level of said Fresnel reflection light or backscattered light from said target optical fiber;
initial value storage means for storing an initial value to be set in said level changing means based on said parameter;
reference value storage means for storing a pre-set reference value to be compared with an output value of said A/D converter as attained after setting said initial value in said level changing means; and
comparing means for comparing said output value of said A/D converter attained after setting said initial value in said level changing means with said reference value stored in said reference value storage means, and computing a compensation value for changing said initial value set in said level changing means.

12. An optical time domain reflectometer comprising:
a first amplifier for amplifying reflection light received from a target optical fiber which is generated by supplying an optical pulse to said target optical fiber;
a variable attenuator for attenuating an output signal of said first amplifier to a given level with a pre-set attenuation amount;
a second amplifier for amplifying a signal attenuated by said variable attenuator;
an A/D converter for subjecting an output signal of said second amplifier to A/D conversion;
an accumulator for accumulating said A/D-converted output signal for each sampling point;
an averaging section for subjecting each data accumulated by said accumulator to exponential average;
a memory for storing each data subjected to exponential average in said averaging section;
a logarithm converter for subjecting each data stored in said memory to logarithm conversion;
a comparator for comparing an output value of said logarithm converter based on a logarithm conversion result with an output value of said logarithm conversion result based on said attenuation amount for said variable attenuator at a saturation time of said second amplifier, which is stored in advance in a storing section;
an arithmetic unit for computing an allowance for an output level with respect to a saturation level of said second amplifier based on a comparison result of said comparator; and
a controller selecting a desired attenuation amount for said variable attenuator to vary said attenuation amount based on said allowance computed by said arithmetic unit.

* * * * *